US008667294B2

(12) United States Patent
Kim et al.

(10) Patent No.: US 8,667,294 B2
(45) Date of Patent: Mar. 4, 2014

(54) APPARATUS AND METHOD FOR PREVENTING FALSIFICATION OF CLIENT SCREEN

(75) Inventors: Byung-Joon Kim, Yongin-si (KR); Jung-Hwan Moon, Seoul (KR); Hyoung-Chun Kim, Seoul (KR); Sang-Woo Park, Daejeon (KR); E-Joong Yoon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 51 days.

(21) Appl. No.: 13/304,069

(22) Filed: Nov. 23, 2011

(65) Prior Publication Data

US 2013/0055386 A1 Feb. 28, 2013

(30) Foreign Application Priority Data

Aug. 30, 2011 (KR) ........................ 10-2011-0087435

(51) Int. Cl.
*H04L 9/00* (2006.01)

(52) U.S. Cl.
USPC .................. 713/182; 726/5; 726/22; 726/23; 726/25; 726/24; 713/150; 713/172; 713/183; 713/168; 709/238; 709/226; 705/26; 705/64; 705/67; 380/1; 380/278; 380/241; 715/208

(58) Field of Classification Search
USPC .......... 713/150, 173, 168, 182; 709/226, 238; 715/208; 340/5.2
See application file for complete search history.

(56) References Cited

U.S. PATENT DOCUMENTS

| 7,500,099 | B1 * | 3/2009 | McElwee et al. ............ 713/168 |
| 7,739,512 | B2 * | 6/2010 | Hawkes ........................ 713/182 |
| 7,841,003 | B1 * | 11/2010 | Emdee ............................ 726/22 |
| 8,079,087 | B1 * | 12/2011 | Spies et al. ...................... 726/26 |
| 2002/0083178 | A1 * | 6/2002 | Brothers ........................ 709/226 |
| 2002/0133697 | A1 * | 9/2002 | Royer et al. .................. 713/150 |
| 2007/0136279 | A1 * | 6/2007 | Zhou et al. ....................... 707/6 |
| 2007/0162961 | A1 * | 7/2007 | Tarrance et al. ................. 726/5 |

(Continued)

FOREIGN PATENT DOCUMENTS

| KR | 10-2006-0059759 A | 6/2006 |
| KR | 10-0867306 B1 | 11/2008 |
| KR | 10-2009-0090810 A | 8/2009 |

OTHER PUBLICATIONS

Lixin Li et al., "Address-Space Randomization for Windows Systems", Annual Computer Security Application Conference, 2006.

*Primary Examiner* — Taghi Arani
*Assistant Examiner* — Sharon Lynch
(74) *Attorney, Agent, or Firm* — LRK Patent Law Firm

(57) ABSTRACT

An apparatus and method for preventing falsification of a client screen is provided, in which a web server dynamically generates URIs and provides them to clients, thus preventing the falsification of client screens due to a web injection attack or a memory hacking attack. The apparatus includes a random web generation unit for converting an identical web page into random URIs that are randomly generated, at a request of a plurality of clients, generating different random web sources, and providing the different random web sources to the respective clients. A web falsification determination unit compares display web source eigenvalues respectively generated by the clients with respect to any one of the random web sources with a generative web source eigenvalue for the one of the random web sources, thus determining whether screens corresponding to the random web sources displayed on the respective clients have been falsified.

16 Claims, 11 Drawing Sheets

(56) References Cited

U.S. PATENT DOCUMENTS

| | | | |
|---|---|---|---|
| 2007/0255953 A1* | 11/2007 | Peyret | 713/168 |
| 2007/0266257 A1* | 11/2007 | Camaisa et al. | 713/182 |
| 2008/0172382 A1* | 7/2008 | Prettejohn | 707/6 |
| 2009/0119777 A1* | 5/2009 | Jeon | 726/25 |
| 2009/0144554 A1* | 6/2009 | Baker | 713/183 |
| 2009/0313136 A1* | 12/2009 | Giblin et al. | 705/26 |
| 2010/0191972 A1* | 7/2010 | Kiliccote | 713/172 |
| 2010/0235918 A1* | 9/2010 | Mizrahi et al. | 726/25 |
| 2010/0293616 A1* | 11/2010 | Young | 726/25 |
| 2010/0306845 A1* | 12/2010 | Vaithilingam et al. | 726/23 |
| 2010/0313250 A1* | 12/2010 | Chow | 726/5 |
| 2011/0140834 A1* | 6/2011 | Kiliccote | 340/5.2 |
| 2011/0145435 A1* | 6/2011 | Bhatawdekar et al. | 709/238 |
| 2011/0252475 A1* | 10/2011 | Mui et al. | 726/23 |
| 2011/0264992 A1* | 10/2011 | Vishria et al. | 715/208 |
| 2012/0011370 A1* | 1/2012 | Duke | 713/183 |
| 2012/0117644 A1* | 5/2012 | Soeder | 726/22 |
| 2012/0159629 A1* | 6/2012 | Lee et al. | 726/24 |

* cited by examiner

FIG. 4

```
a = randomstring(3);
print("<script>\n $a=10");
```

FIG. 5

```
func_name = randomstirng(5);
print("<script>\n function $func_name() {....} </script>
    <body onload=$func_name()");
```

FIG. 6

```
account_no = _POST("ACCOUNT_NO");
account_no = _POST(GET_SESSION_VALUE("ACCOUNT_NO"));
```

FIG. 7

```
print("<!-- RANDOM CHARACTER STRING -->");
print("<table id=table0 style=display:none>");
print("<table id=table2 style=display:none>");
print("<table id=table1 ... >"); func_name = randomstirng(5);
print("<script>\n function $func_name() {....} </script>
    <body onload=$func_name()");
print("<script> function abc()
    { b=10; c=10; a=10; /* RANDOM CHARACTER STRING */ ... a=a+10; ... }");
```

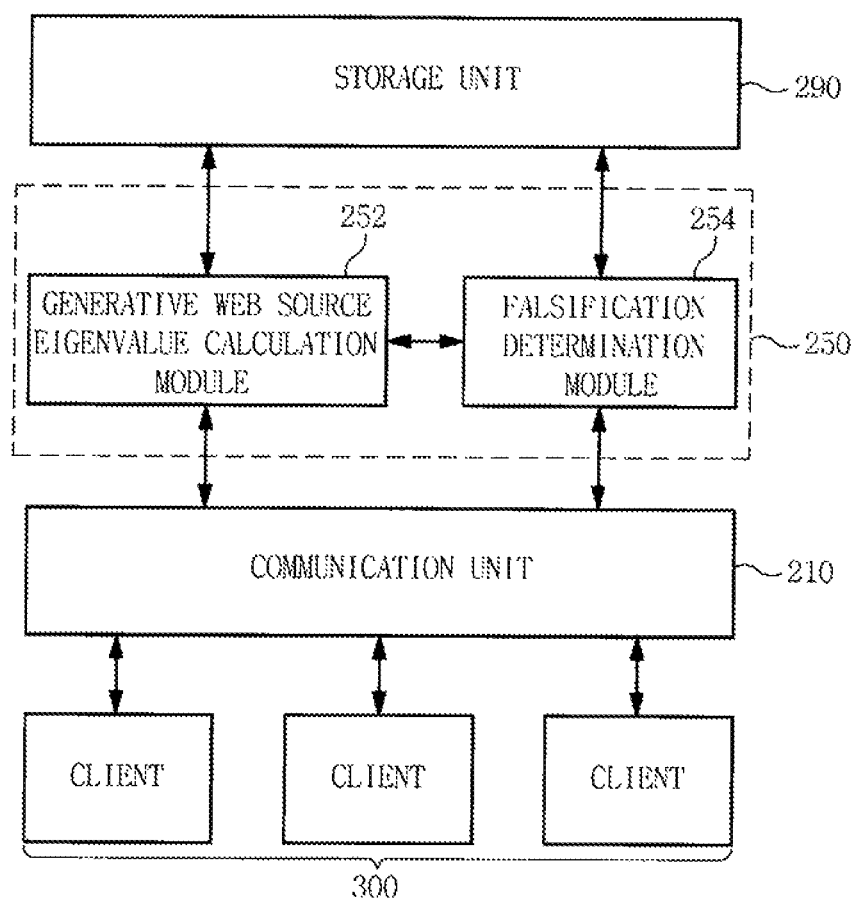

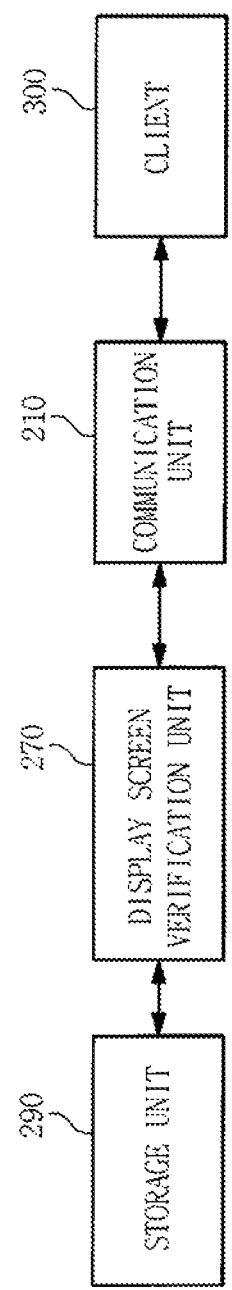

APPARATUS AND METHOD FOR PREVENTING FALSIFICATION OF CLIENT SCREEN

CROSS REFERENCE TO RELATED APPLICATION

This application claims the benefit of Korean Patent Application No. 10-2011-0087435, filed on Aug. 30, 2011, which is hereby incorporated by reference in its entirety into this application.

BACKGROUND OF THE INVENTION

1. Technical Field

The present invention relates generally to an apparatus and method for preventing the falsification of a client screen and, more particularly, to an apparatus and method for preventing the falsification of a client screen, which can defend a user screen against attacks by which data received from a server is modified using a web injection attack, a memory hacking attack, or the like to cause the user screen to be forged.

2. Description of the Related Art

An attack of falsifying a client screen is one of the attack methods used to hack user information, and is carried out in such a way that screen-related information provided by a web server is falsified due to malicious code installed on a user computer (that is, a client), an inappropriate screen is displayed on the client, and then the information of the user is hacked. That is, such an attack of falsifying a client screen is a kind of attack wherein a screen unintended by the user is transferred after falsifying the screen transmitted from a server using web injection, memory hacking or the like before a relevant web page is displayed to the user. In the case of this attack, the data viewed by the user and the data processed by a service provider are different from each other.

The technique of web injection is configured to falsify received data after a server's response to a user's Uniform Resource Locator (URL) request has been received from a user (in the case of a request and a response using Hypertext Transfer Protocol Secure: HTTPS) via a web browser. The server's response is composed of pieces of text configuring a screen such as in Hypertext Markup Language (HTML), JavaScript, or Extensible Markup Language (XML). A hacker can perform his or her desired task under the authority of the user by falsifying (inserting, substituting, deleting, or the like) the server's response using a web injection technique or a memory hacking technique. For example, when there is a homepage that receives an ID and a password from the user and that enables the user's password to be entered using a keyboard security solution, a hacker may add an input tag such as "password confirmation" entry using a screen falsification technique, thus inducing the user to re-enter his or her password. Since the input tag injected by the hacker is not protected by the keyboard security solution, the hacker can easily access the user's password. A memory hacking attack is a method of changing or modifying the values of the memory of a client, and displaying falsified data or transferring the falsified data to a server. Since this attack is made without the service provider's and the user's knowledge, it is difficult for the web page provider and the user to be aware of such an attack.

A conventional representative method of coping with these attacks is implemented using a scheme for installing a vaccine that is capable of detecting and eliminating malicious code installed on a client, and then preventing the attacks from being made. This scheme can cope with well-known malicious code and can fundamentally eliminate such malicious code, thus effectively coping with the attacks. However, this method is disadvantageous in that it cannot defend the client against mutant malicious code which the vaccine cannot detect, and is problematic in that this scheme depends on a user, and thus a service provider cannot cope with such attacks.

Another conventional method of coping may include a method of preventing the forgery of memory data of a computer application program. Such a method is configured to hook a memory data-related Application Programming Interface (API) function during the execution of a specific application program on a computer and then to prohibit access to memory data due to a hacking program from being made. Accordingly, the forgery of memory data can be prevented early so that the results of the execution of the memory data-related API function do not influence a program to be protected. This method has the effect of initially blocking abnormal access to memory data, but has the problem of having to install exclusive software such a secure browser and making it difficult to cope with new memory attack methods.

A further conventional method of coping may include address space randomization. This enables a memory address space, which is used or newly allocated whenever a program is operated, to be handled so that it is randomly changed. Accordingly, even if overflow occurs when an input value forged by a hacker is transmitted, the memory address space is not used in the manner in which the hacker had initially anticipated to be used, thus making it impossible to freely change program control. This method can efficiently cope with buffer overflow attacks, but is problematic in that it cannot cope with web injection attacks.

SUMMARY OF THE INVENTION

Accordingly, the present invention has been made keeping in mind the above problems occurring in the prior art, and an object of the present invention is to provide an apparatus and method for preventing the falsification of a client screen, which can prevent the falsification of the client screen due to a web injection attack, a memory hacking attack or the like, by providing random webs, such as URIs and web sources that are dynamically generated, to clients.

Another object of the present invention is to provide an apparatus and method for preventing the falsification of a client screen, which determine whether a web document generated by a web provider to process the request of a client has been falsified during a procedure for displaying the web document on the client.

A further object of the present invention is to provide an apparatus and method for preventing the falsification of a client screen, which transfer the principal information of a displayed screen to a web provider (that is, a web server), so that the web provider (that is, the web server) verifies the screen recognized by a client, thus determining whether data has been changed.

In accordance with an aspect of the present invention to accomplish the above objects, there is provided an apparatus for preventing falsification of a client screen, including a random web generation unit for converting an identical web page into random Uniform Resource Identifiers (URIs) that are randomly generated, at a request of a plurality of clients, generating different random web sources, and providing the different random web sources to the respective clients; and a web falsification determination unit for comparing display web source eigenvalues respectively generated by the clients with respect to any one of the random web sources with a generative web source eigenvalue for the one of the random web sources, thus determining whether screens corresponding to the random web sources displayed on the respective clients have been falsified.

Preferably, the random web generation unit may include a random URI generation module for generating the random URIs corresponding to the web page requested by the plurality of clients; and a random web source generation module for generating the random web sources in connection with the generated random URIs.

Preferably, the random web source generation module may generate random variables corresponding to variables that are included in a web source corresponding to the web page corresponding to the generated random URIs, convert the variables of the web source into the generated random variables, and then generate the random web sources.

Preferably, the random web source generation module may insert meaningless web source text into a random location, and randomly changes at least one of a variable name, a tag name, and a function name that are included in a web source.

Preferably, the web falsification determination unit may include a generative web source eigenvalue calculation module for calculating generative web source eigenvalues of the random web sources; and a falsification determination module for comparing the display web source eigenvalues generated by the respective clients with the calculated generative web source eigenvalues, thus determining whether screens corresponding to the web sources displayed on the respective clients have been falsified.

Preferably, the generative web source eigenvalue calculation module may calculate the generative web source eigenvalues using at least one unique key that is shared with the plurality of clients.

Preferably, the falsification determination module may share different unique keys with the respective clients.

Preferably, the falsification determination module may receive a display web source eigenvalue of a random web source calculated using the unique key from at least one of the plurality of clients.

Preferably, the apparatus may further include a storage unit for storing the generated random URIs, the random web sources, and the generative web source eigenvalue calculated to determine whether the screens corresponding to the random web sources have been falsified.

Preferably, the apparatus may further include a display screen verification unit for requesting entry of input information corresponding to principal information by transmitting the principal information to at least one of the plurality of clients, and for verifying whether a display screen has been falsified by comparing the input information received from the at least one of the clients with the principal information.

In accordance with another aspect of the present invention to accomplish the above objects, there is provided a method of preventing falsification of a client screen, including at a random web generation unit, converting an identical web page into random Uniform Resource Identifiers (URIs) that are randomly generated, at a request of a plurality of clients, generating different random web sources, and providing the different random web sources to the respective clients; and at a web falsification determination unit, comparing display web source eigenvalues respectively generated by the clients with respect to any one of the random web sources with a generative web source eigenvalue for the one of the random web sources, thus determining whether screens corresponding to the random web sources displayed on the respective clients have been falsified.

Preferably, the providing the random web sources may include at the random web generation unit, if a previously generated random web source corresponding to a web request received from at least one of the plurality of clients is not present, generating a random Uniform Resource Identifier (URI) for a web page corresponding to the web request; at the random web generation unit, generating a random web source in connection with the generated random URI; at the random web generation unit, storing the generated random URI and the random web source; and at the random web generation unit, transmitting the generated random web source to at least one of the plurality of clients.

Preferably, the providing the random web source may further include, at the random web generation unit, if the previously generated random web source corresponding to the received web request is present, detecting the random web source, and the transmitting is configured such that, at the random web generation unit, the detected random web source is transmitted to the client.

Preferably, the generating the random web source may include at the random web generation unit, generating random variables corresponding to variables that are included in the web page corresponding to the generated random URI; and at the random web generation unit, changing the variables included in the web page to the generated random variables, thus generating random web sources.

Preferably, the generating the random web source may include at least one of at the random web generation unit, randomly inserting meaningless web source text into a random location; and at the random web generation unit, randomly changing at least one of a variable name, a tag name, and a function name that are included in a web source.

Preferably, the determining whether the screens have been falsified may include at the web falsification determination unit, receiving a display web source eigenvalue for a random web source calculated from at least one of the plurality of clients using at least one unique key that is shared with the client; at the web falsification determination unit, calculating a generative web source eigenvalue for the random web source using the unique key; and at the web falsification determination unit, comparing the received display source eigenvalue with the calculated generative web source eigenvalue, thus determining whether a relevant screen has been falsified.

Preferably, the determining whether the screens have been falsified may further include, at the web falsification determination unit, sharing at least one unique key required to calculate web source eigenvalues with the plurality of clients, and the sharing the unique key is configured such that, at the web falsification determination unit, different unique keys are shared with the respective clients.

Preferably, the determining whether the screens have been falsified may further include, at a storage unit, storing the calculated generative web source eigenvalue.

Preferably, the method may further include, at a display screen verification unit, verifying whether a display screen corresponding to the web source has been falsified, based on input information related to principal information transmitted to at least one of the plurality of clients.

Preferably, the verifying whether the display screen has been falsified may include at the display screen verification unit, transmitting the principal information to at least one of the plurality of clients; at the display screen verification unit, displaying the transmitted principal information on the at least one of the plurality of clients and then requesting entry of input information; at the display screen verification unit, receiving the input information from the at least one of the plurality of clients; and at the display screen verification unit, comparing the transmitted principal information with the received input information, and then verifying whether the display screen has been falsified.

According to the present invention, the client screen falsification prevention apparatus and method are advantageous in that random webs in which Uniform Resource Identifiers (URIs) and web sources are dynamically generated are provided to respective clients, thus preventing the falsification of the screen of each client from occurring due to a web injection attack, a memory hacking attack, etc. That is, the client screen falsification prevention apparatus and method are advantageous in that even if malicious code or hacking tools are installed on the client, the web server generates and provides a random web such as a web page, and thus a normal screen which avoids attacks can be provided to the client being subjected to a screen falsification attack.

Further, the client screen falsification prevention apparatus and method are advantageous in that when the screen displayed on the client is attacked and falsified, the web server can recognize whether the screen has been falsified by determining whether the principal information of the screen has been falsified, thus coping with the falsification of the screen.

Furthermore, the client screen falsification prevention apparatus and method are also advantageous in that mutual authentication between each client and the web server is carried out by determining whether principal data transmitted or received therebetween has been changed, so that hacking, caused by the falsification of the screen on the client after authenticating users, can be detected and prevented at the time of conducting important transactions (for example, Internet banking, stock trading, electronic commerce, etc.) over the Internet. That is, in existing security solutions, each user has been authenticated using a password or a One-Time Password (OTP) upon conducting important transactions (for example, Internet backing, stock trading, electronic commerce, etc.) over the Internet. However, in order to solve the problem of the existing security solutions in that it was impossible to determine whether contents displayed on the screen of the client are identical to contents provided by the service provider, the present invention can detect most hacking trials based on the falsification of the screen of the user using a method of checking whether an important transaction such as an electronic transaction recognized by the user is identical to a transaction desired to be performed by the service provider.

Furthermore, the client screen falsification prevention apparatus and method have the advantage of coping with screen falsification attacks such as a web injection attack attributable to unknown malicious code.

BRIEF DESCRIPTION OF THE DRAWINGS

FIGS. 3 to 7 are diagrams showing the random web generation unit of FIG. 2.

FIG. 8 is a diagram showing the web falsification determination unit of FIG. 2.

FIGS. 9 to 11 are diagrams showing the display screen verification unit of FIG. 2.

DESCRIPTION OF THE PREFERRED EMBODIMENTS

Figure 1:
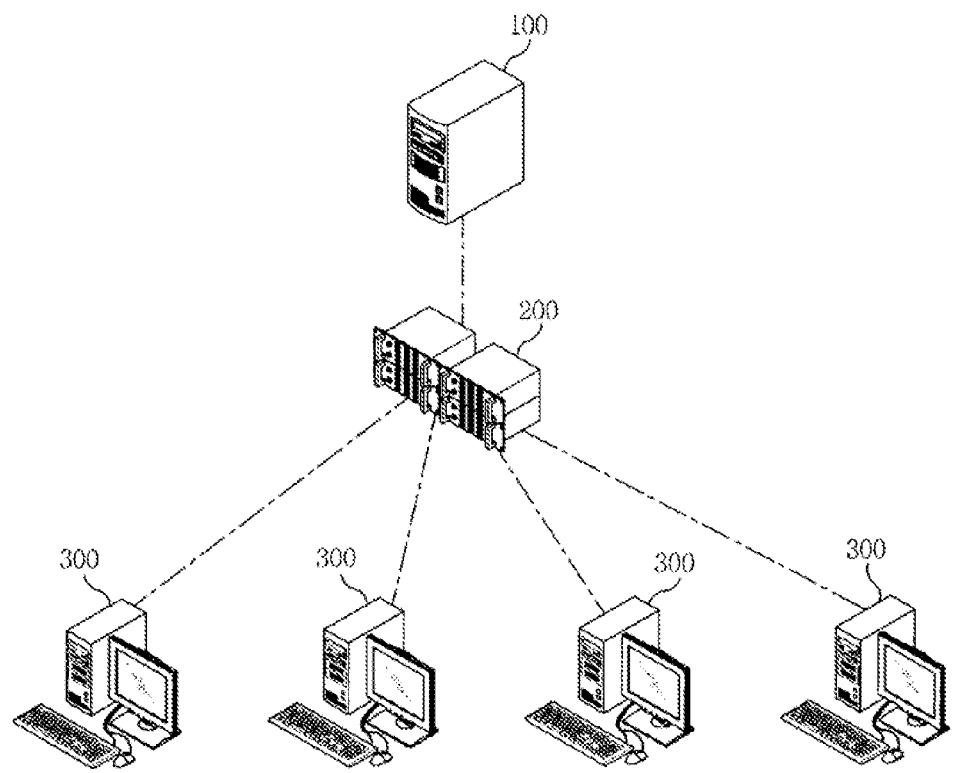
FIG. 1 is a diagram showing a web service system including an apparatus for preventing the falsification of a client screen according to an embodiment of the present invention.

The present invention will be described in detail below with reference to the accompanying drawings to such an extent that those skilled in the art can easily implement the technical spirit of the present invention. Reference now should be made to the drawings, in which the same reference numerals are used throughout the different drawings to designate the same or similar components. In the following description, redundant descriptions and detailed descriptions of known functions and elements that may unnecessarily make the gist of the present invention obscure will be omitted.

Hereinafter, a web service system including an apparatus for preventing the falsification of a client screen according to an embodiment of the present invention will be described in detail with reference to the attached drawings. FIG. 1 is a diagram showing a web service system including an apparatus for preventing the falsification of a client screen according to an embodiment of the present invention.

As shown in FIG. 1, the web service system includes a web server 100, an apparatus 200 for preventing the falsification of a client screen (hereinafter referred to as a "client screen falsification prevention apparatus 200"), and a plurality of clients 300.

The web server 100 manages a plurality of web pages provided to the plurality of clients 300. In this case, the web server 100 is connected to the client screen falsification prevention apparatus 200 over a network. The web server 100 transmits a relevant web page (or a relevant web source) to the client screen falsification prevention apparatus 200 in response to a web request received from a relevant client 300.

The client screen falsification prevention apparatus 200 provides the same web page provided by the web server 100 to the individual clients 300 in the form of different random web sources so as to prevent the screens of the clients 300 from being falsified due to a web injection attack, a memory hacking attack or the like. That is, the client screen falsification prevention apparatus 200 converts the same web page requested by the clients 300 into random Uniform Resource Identifiers (URIs) that are randomly generated. The client screen falsification prevention apparatus 200 provides different random web sources to the respective clients 300 using the randomly generated URIs. The client screen falsification prevention apparatus 200 verifies the integrity of display screens (whether the display screens have been falsified) using response information to pieces of information displayed on the clients 300. Here, the client screen falsification prevention apparatus 200 is shown as being formed separately from the web server 100, but it may be included in the web server 100 in the form of a module or an application.

In this way, in the present invention, whenever each client 300 (that is, each user) requests a web from the web server 100 via the client screen falsification prevention apparatus 200, the web server 100 (that is, the web page provider) responds to the request by randomly generating a URI or a web source having the same function. In this case, the client screen falsification prevention apparatus 200 stores web page provision information about web pages provided to respective users in the web server 100 (for example, in web sessions), and guarantees the provision of the same functionality and screen for different pieces of source code with respect to all web requests.

Each client 300 calculates a display web source eigenvalue which becomes the basis for determining whether a client screen has been falsified. That is, the client 300 calculates the display web source eigenvalue of a displayed web source using a unique key that is shared with the client screen falsification prevention apparatus 200. The client 300 transmits the calculated display web source eigenvalue to the client screen falsification prevention apparatus 200.

The client 300 displays the principal information received from the client screen falsification prevention apparatus 200 so as to verify the display screen. The client 300 receives input information related to the displayed principal information and transmits the input information to the client screen falsification prevention apparatus 200.

Figure 12:
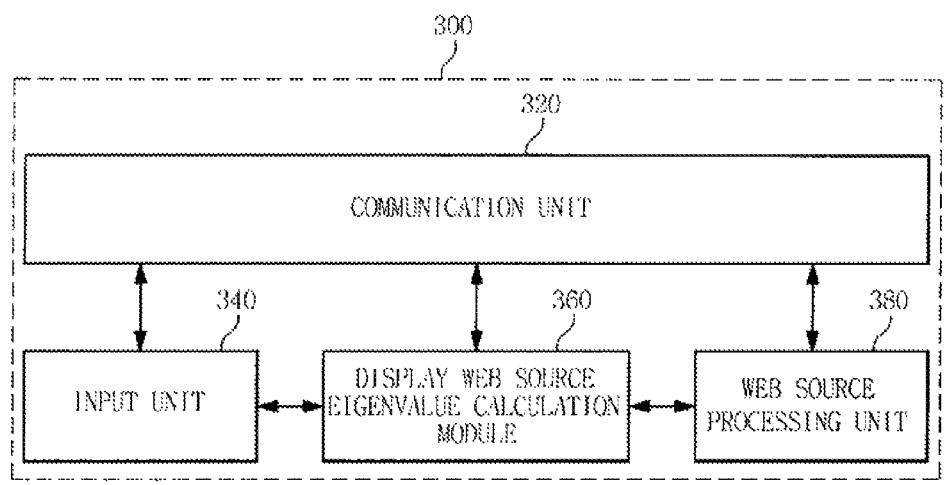
FIG. 12 is a diagram showing the client of FIG. 1.

For this, as shown in FIG. 12, the client 300 includes a communication unit 320 for transmitting or receiving data to or from the client screen falsification prevention apparatus 200, an input unit 340 for receiving input information related to displayed principal information, a display web source eigenvalue calculation unit 360 for calculating the display web source eigenvalue of a displayed web source using a unique key, and a web source processing unit 380 for displaying the web source and the principal information, which are received from the client screen falsification prevention apparatus 200, on a screen.

Figure 2:
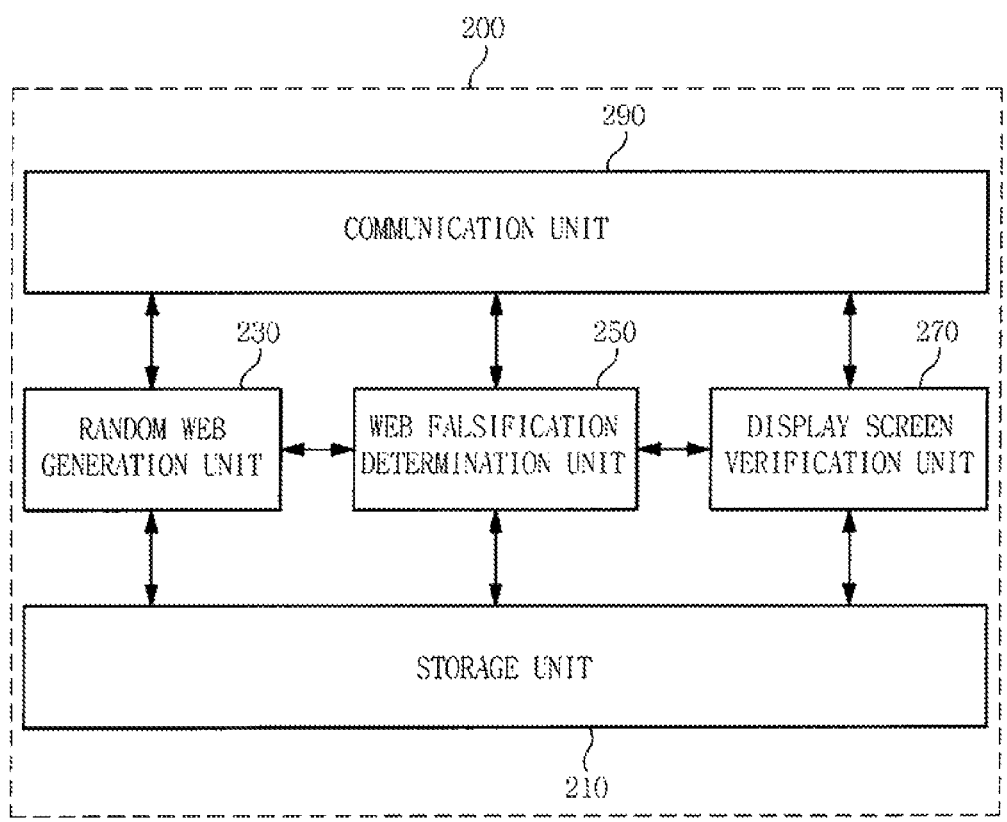
FIG. 2 is a diagram showing an apparatus for preventing the falsification of a client screen according to an embodiment of the present invention.

Hereinafter, the client screen falsification prevention apparatus 200 according to an embodiment of the present invention will be described in detail with reference to the attached drawings. FIG. 2 is a diagram showing the client screen falsification prevention apparatus 200 according to an embodiment of the present invention. FIGS. 3 to 7 are diagrams showing the random web generation unit 230 of FIG. 2, FIG. 8 is a diagram showing the web falsification determination units 250 of FIG. 2, FIGS. 9 to 11 are diagrams showing the display screen verification unit 270 of FIG. 2, and FIG. 12 is a diagram showing the client 300 of FIG. 1.

As shown in FIG. 2, the client screen falsification prevention apparatus 200 includes a communication unit 210, a random web generation unit 230, a web falsification determination unit 250, a display screen verification unit 270, and a storage unit 290.

The communication unit 210 transmits or receives data to or from the plurality of clients 300. That is, the communication unit 210 transmits or receives data that is used to prevent the falsification of the screen of each client 300 to or from the client 300.

The communication unit 210 transmits a random web source generated by the random web generation unit 230 to a client 300 that made a web request.

The communication unit 210 receives a display web source eigenvalue from the client 300. The communication unit 210 transmits the received display web source eigenvalue to the web falsification determination unit 250.

The communication unit 210 transmits the principal information generated by the display screen verification unit 270 to the client 300. The communication unit 210 receives input information related to the transmitted principal information from a relevant client 300 and transmits the input information to the display screen verification unit 270.

Figure 3:
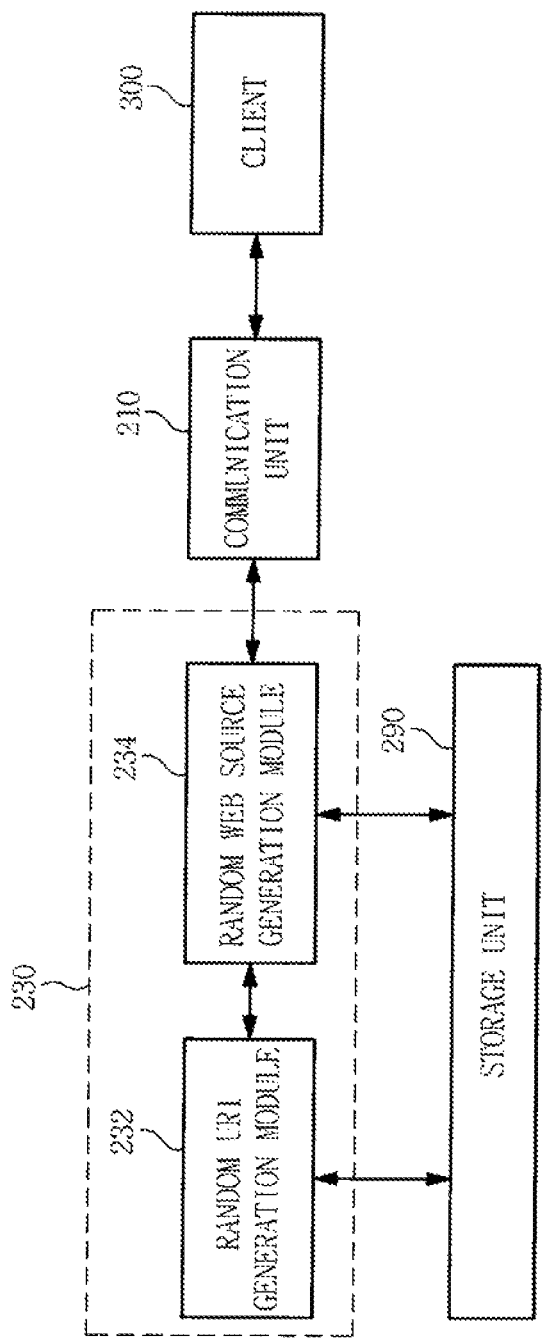

The random web generation unit 230 converts the same web page requested by the plurality of clients 300 into random URIs that are randomly generated, and provides the different random web sources to the respective clients 300. That is, the random web generation unit 230 generates different random web sources for the same web page and provides the different random web sources to the respective clients 300. In this case, the random Web generation unit 230 stores and manages the generated random URIs in the storage unit 290 so as to provide the random URIs to the respective clients 300. The random web generation unit 230 may also store the random web sources in the storage unit 290. For this operation, as shown in FIG. 3, the random web generation unit 230 includes a random URI generation module generation module 232 and a random web source generation module 234.

The random URI generation module 232 generates random URIs corresponding to a web page requested by individual clients 300. That is, the random URI generation module 232 generates dynamic URIs, which are randomly implemented for the same web page, at the request of the clients 300. The random URI generation module 232 stores the generated random URIs in the storage unit 290.

The random web source generation module 234 generates random web sources in connection with the random URIs generated by the random URI generation module 232. In this case, the random web source generation module 234 generates random variables corresponding to variables that are included in the relevant web page corresponding to the random URIs generated by the random URI generation module 232. The random web source generation module 234 converts the variables of the web source corresponding to the web page into previously generated random variables, and then generates random web sources.

The random web source generation module 234 randomly changes one of a variable name, a tag name, and a function name that are included in the web source and then inserts the randomly changed results into the relevant web source. For example, as shown in FIG. 4, the random web source generation module 234 generates a random character string composed of three characters. The random web source generation module 234 changes the name of a JavaScript variable included in the web page to a generated random character string. As shown in FIG. 5, the random web source generation module 234 generates a random character string composed of five characters. The random web source generation module 234 converts the name of a JavaScript function included in the web page into a random character string composed of five characters. As shown in FIG. 6, the random web source generation module 234 randomizes the name of a tag used in the form of the web page. In this case, characters that are randomly generated to randomize the tag name corresponding to ACCOUNT_NO are stored in the web sessions.

The random web source generation module 234 inserts meaningless web source text into a random location of the web source. For example, as shown in FIG. 7, the random web source generation module 234 inserts meaningless text that is not displayed on the screen of each client 300 into the second and third rows of the web source.

In this way, in order to prevent the location of web injection from being found using malicious code, the random web source generation module 234 changes the name of a JavaScript function included in the web page to a generated random character string, changes the name of a JavaScript variable included in the web page to a generated random character string, and randomizes the name of a tag used in the form of the web page, and inserts meaningless HTML text into a random location of JavaScript syntax code.

The random web source generation module 234 stores the generated random web sources in the storage unit 290. The random web source generation module 234 transmits a relevant random web source to the client 300 that made the web request via the communication unit 210.

The web falsification determination unit 250 determines using the eigenvalues of the random web sources whether the screens of the clients 300 have been falsified. That is, the web falsification determination unit 250 may determine whether a screen corresponding to the random web source displayed on each client 300 has been falsified by comparing the display web source eigenvalue of the random web source provided from the random web generation unit 230 to the client 300 with the generative web source eigenvalue of the random web source generated by the random web generation unit 230.

For this operation, as shown in FIG. 8, the web falsification determination unit 250 includes a generative web source eigenvalue calculation module 252 and a falsification determination module 254.

The generative web source eigenvalue calculation module 252 calculates the generative web source eigenvalues of random web sources generated by the random web generation unit 230. In this case, the generative web source eigenvalue calculation module 252 calculates the generative web source eigenvalues of the random web sources using unique keys that are shared with clients 300. The generative web source eigenvalue calculation module 252 stores the calculated generative web source eigenvalues in the storage unit 290.

The falsification determination module 254 determines whether the screen corresponding to each displayed web source has been falsified by comparing a display web source eigenvalue for the random web source received from the client 300 with a relevant generative web source eigenvalue. In this case, the falsification determination module 254 receives the display web source eigenvalue from the client via the communication unit 210. That is, the client 300 calculates the display web source eigenvalue using a shared unique key. The client 300 transmits the calculated display web source eigenvalue to the falsification determination module 254 over the network. For example, the falsification determination module 254 (or the web server 100 (that is, the web service provider)) shares a unique key required to calculate an eigenvalue via a secure method. In this case, the falsification determination module 254 shares the unique key with the client 300 by using a value only the client 300 and the falsification determination module 254 are aware of, for example a Diffie-Hellman (DH) Key exchange, an ID or a password. The falsification determination module 254 calculates a generative web source eigenvalue that has been generated using the web page provided whenever each client 300 requests a web source from the web server 100. Here, the web source is the term collectively designating sources used to provide web page services, such as HTML, JavaScript, or XML sources. A generative web source eigenvalue denotes a resulting value obtained by converting such a web source into Hash-based Message Authentication Code (HMAC). After the falsification determination module 254 stores the calculated generative web source eigenvalue in the storage unit 290, it transmits the generative web source eigenvalue to a relevant client 300. The client 300, after displaying the received web source (that is, the web page) on the screen, calculates a display web source eigenvalue, and transmits the display web source eigenvalue to the falsification determination module 254. The falsification determination module 254 determines whether the screen has been falsified by comparing the stored web source eigenvalue with the received display web source eigenvalue. In this case, if the display screen has been falsified, the falsification determination module 254 notifies the web server 100 (that is, the web service provider) that the screen was falsified.

Figure 10:
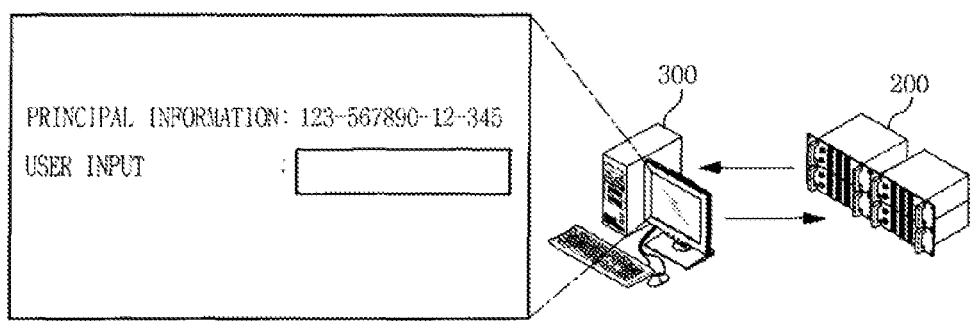
Figure 11:
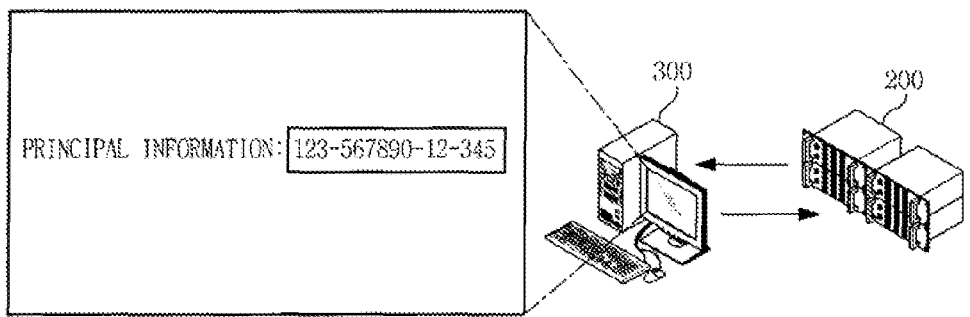

The display screen verification unit 270 verifies, using the input information corresponding to the principal information provided to the client 300, whether the screen displayed on the client 300 has been falsified. That is, as shown in FIG. 9, the display screen verification unit 270 generates principal information and stores it in the storage unit 290. In this case, the display screen verification unit 270 may detect previously generated principal information from the storage unit 290 instead of generating the principal information. The display screen verification unit 270 transmits the generated principal information to the client 300 via the communication unit 210. As shown in FIG. 10, the client 300 displays on the screen the received principal information and an input window required to request the entry of the input information, thus requesting the user to enter the input information corresponding to the principal information. In this case, when a memory hacking attack or a web injection attack is made, another piece of information entered by a hacker is displayed on the screen of the client 300 instead of the principal information. As shown in FIG. 11, the client 300 recognizes the input information entered by the user using a character recognizer. The client 300 transmits the recognized input information to the display screen verification unit 270 via the communication unit 210. The display screen verification unit 270 verifies whether the display screen has been falsified by comparing the input information received from the client 300 with the previously transmitted principal information. The display screen verification unit 270 provides a subsequent service (that is, a web page) to the client 300 only if the transmitted principal information is identical to the received input information. In this case, the principal information that must be requested to be entered by the user or must be recognized by the character recognizer must be randomly selected without being designated. That is, the principal information is composed of different pieces of information for respective clients 300 (for example, the name, unique number, etc. of each user) and is then provided. In this case, each client 300 requests a relevant user to enter input information including all of characters and numerals contained in the principal information. Of course, the client may also request the user to enter input information including only some of the characters and numerals contained in the principal information. For example, when the principal information is the name of a user, the client 300 of a first user requests the first user to enter a first character and a third character of the first user's name, the client 300 of a second user requests the second user to enter a second character and a third character of the second user's name, and the client 300 of a third user requests the third user to enter only the initial consonant of the third user's name.

The storage unit 290 stores random URIs and random web sources generated by the random web generation unit 230. The storage unit 290 stores the generative web source eigenvalues calculated by the web falsification determination unit 250 to determine whether the screens corresponding to the random web sources have been falsified.

Figure 13:
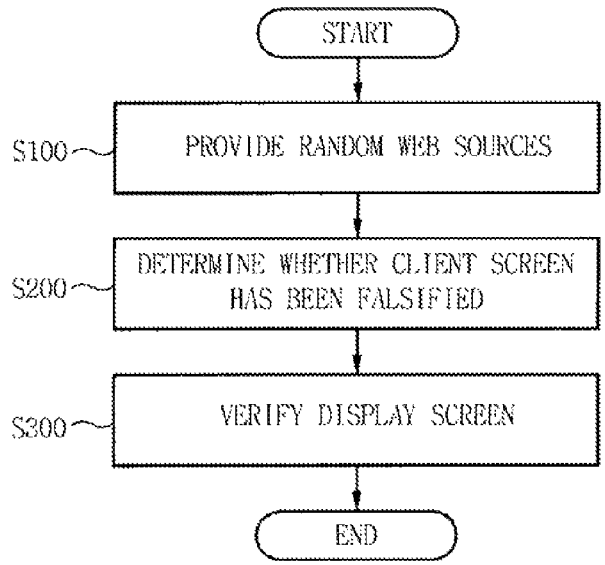
FIG. 13 is a flowchart showing a method of preventing the falsification of a client screen according to an embodiment of the present invention.
Figure 14:
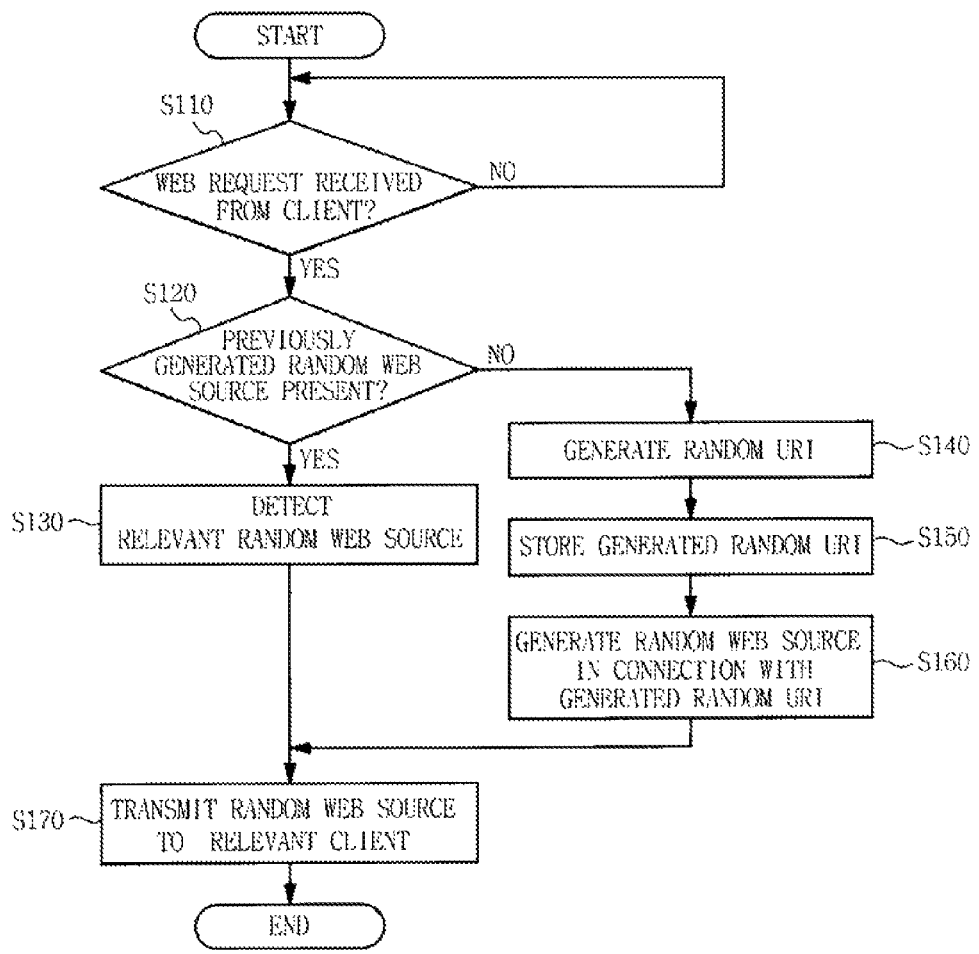
FIG. 14 is a flowchart showing the random web page provision step of FIG. 13.
Figure 15:
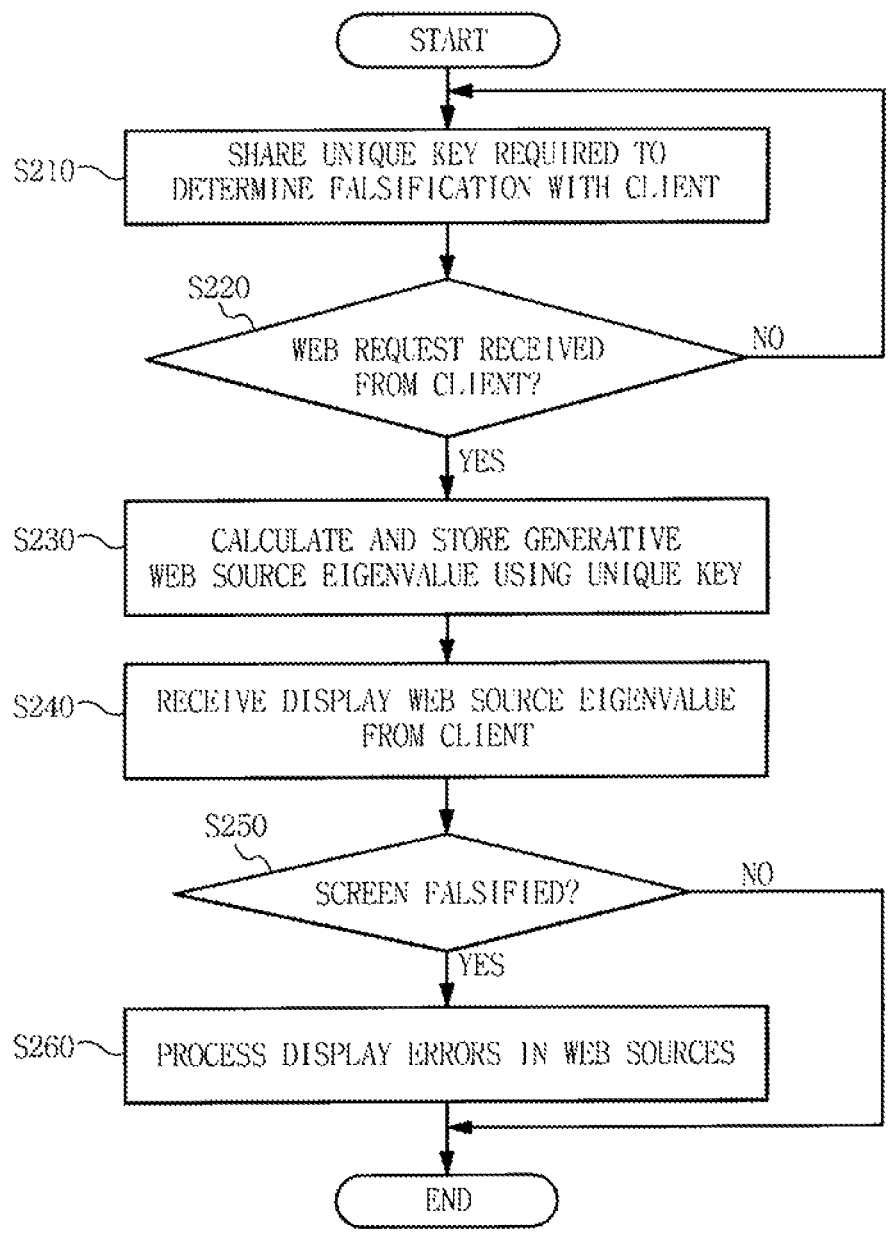
FIG. 15 is a flowchart showing the web page falsification determination step of FIG. 13.
Figure 16:
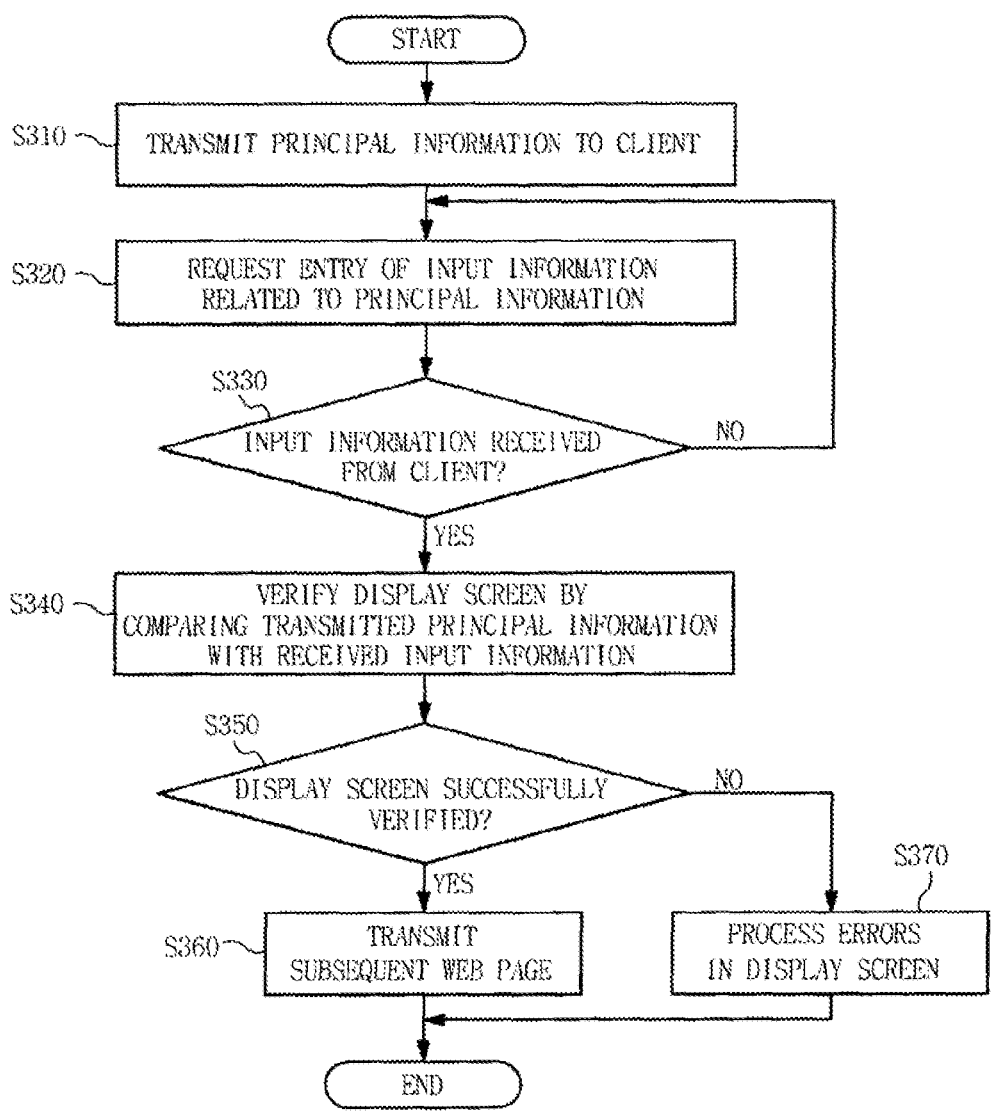
FIG. 16 is a flowchart showing the display screen verification step of FIG. 13.

Hereinafter, a method of preventing the falsification of the screen of a client 300 according to an embodiment of the present invention will be described in detail with reference to the attached drawings. FIG. 13 is a flowchart showing a method of preventing the falsification of the screen of the client 300 according to an embodiment of the present invention. FIG. 14 is a flowchart showing the random web page provision step of FIG. 13, FIG. 15 is a flowchart showing the web page falsification determination step of FIG. 13, and FIG. 16 is a flowchart showing the display screen verification step of FIG. 13.

The client screen falsification prevention apparatus 200 converts the same web page requested by a plurality of clients 300 into random URIs that are randomly generated, and then provides different random web sources to the respective clients 300 at step S100. The random web source provision step will be described in detail with reference to the attached drawings.

If a web request made by a relevant client 300 is received at step S110 (in the case of YES), the client screen falsification prevention apparatus 200 determines whether a previously generated random web source corresponding to the web request is present at step S120.

If it is determined at step S120 that the previously generated random web source is present (in the case of YES), the client screen falsification prevention apparatus 200 detects the random web source corresponding to the web request from a plurality of random web sources stored in the storage unit 290 at step S130.

if it is determined at step S120 that there is no previously generated random web source (in the case of NO), the client screen falsification prevention apparatus 200 generates a random URI for the web page corresponding to the web request at step S140.

After storing the generated random URI in the storage unit 290 at step S150, the client screen falsification prevention apparatus 200 generates a random web source in connection with the generated random URI at step S160. That is, the client screen falsification prevention apparatus 200 generates random variables corresponding to variables that are included in the web page corresponding to the generated random URI. The client screen falsification prevention apparatus 200 changes the variables included in the web page into the generated random variables, and then generates a random web source. Thereafter, the client screen falsification prevention apparatus 200 randomly inserts meaningless web source text into a random location of the web source. Of course, the client screen falsification prevention apparatus 200 may randomly change at least one of a variable name, a tag name, and a function name in the web source, and may insert the changed results into the web source.

The client screen falsification prevention apparatus 200 transmits the detected random web source or the generated random web source to the client 300 that made the web request at step S170.

The client screen falsification prevention apparatus 200 determines whether the screen corresponding to the random web source displayed on the client 300 has been falsified by comparing the display web source eigenvalue of the random web source, provided to the client 300 at the step of providing the different random web sources, with the generative web source eigenvalue of the random web source at step S200. The step of determining whether the screen has been falsified will be described in detail below with reference to the attached drawings.

First, the client screen falsification prevention apparatus 200 shares unique keys required to determine the occurrence of falsification with the plurality of clients 300 at step S210. In this case, the client screen falsification prevention apparatus 200 shares different unique keys with the respective clients 300. Of course, the client screen falsification prevention apparatus 200 may also share a single unique key or a plurality of partially overlapping unique keys with the plurality of clients 300.

When a web request is received from a relevant client 300 at step S220 (in the case of YES), the client screen falsification prevention apparatus 200 calculates a generative web source eigenvalue for the random web source provided to the relevant client 300, and stores the generative web source eigenvalue at step S230. In this case, the client screen falsification prevention apparatus 200 calculates the generative web source eigenvalue using a unique key that is shared with the client 300 that made the web request.

The client screen falsification prevention apparatus 200 receives the display web source eigenvalue from the client 300 at step S240. In this case, the client 300 calculates the display web source eigenvalue for the web source displayed on the screen using the shared unique key, and transmits the display web source eigenvalue to the client screen falsification prevention apparatus 200.

The client screen falsification prevention apparatus 200 determines whether the screen has been falsified by comparing the received display web source eigenvalue with the calculated generative web source eigenvalue. Here, when the two eigenvalues are different from each other, the client screen falsification prevention apparatus 200 determines that the screen has been falsified. In contrast, if the two eigenvalues are identical to each other, the client screen falsification prevention apparatus 200 determines that the screen has not been falsified.

If it is determined that the screen has been falsified at step S250 (in the case of YES), the client screen falsification prevention apparatus 200 performs the processing of display errors in the web page at step S260. That is, the client screen falsification prevention apparatus 200 displays an error message on the screen of the client 300 or sends an error message to the web server 100, thus notifying the web service provider of the occurrence of the falsification of the screen.

The client screen falsification prevention apparatus 200 verifies whether the display screen corresponding to the web source has been falsified, on the basis of the input information related to the principal information transmitted to the client 300, at step S300. The step of verifying whether the display screen has been falsified will be described in detail with reference to the attached drawings.

First, the client screen falsification prevention apparatus 200 transmits the principal information to the client 300 to verify the display screen at step S310. Here, the principal information is information, generated by a combination of numerals and characters, and such principal information is randomly generated whenever verification is performed.

The client 300 displays the principal information received from the client screen falsification prevention apparatus 200 on the screen, and then requests the user to enter relevant input information at step S320. The user enters the input information corresponding to the displayed principal information. The client 300 transmits the entered input information to the client screen falsification prevention apparatus 200.

When the input information is received from the client 300 at step S330 (in the case of YES), the client screen falsification prevention apparatus 200 verifies the display screen by comparing the transmitted principal information with the received input information at step S340. In this case, the client screen falsification prevention apparatus 200 determines that the verification of the display screen has been successfully performed when the principal information is identical to the input information.

If the verification of the display screen has been successfully performed at step S350 (in the case of YES), the client screen falsification prevention apparatus 200 transmits a subsequent web page at step S360.

If the verification of the display screen has failed at step S350 (in the case of NO), the client screen falsification prevention apparatus 200 performs the processing of errors in the display screen at step S370. That is, the client screen falsification prevention apparatus 200 sends an error message to the client 300 and then displays it on the screen. The client screen falsification prevention apparatus 200 sends the error message to the web server and then notifies the web service provider of the failure to verify the display screen.

As described above, the client screen falsification prevention apparatus 200 and method are advantageous in that random webs in which URIs and web sources are dynamically generated are provided to respective clients 300, thus preventing the falsification of the screen of each client 300 from occurring due to a web injection attack, a memory hacking attack, etc. That is, the client screen falsification prevention apparatus 200 and method are advantageous in that even if malicious code or hacking tools are installed on the client 300, the web server 100 generates and provides a random web such as a web page, and thus a normal screen which avoids attacks can be provided to the client 300 being subjected to a screen falsification attack.

Further, the client screen falsification prevention apparatus 200 and method are advantageous in that when the screen displayed on the client 300 is attacked and falsified, the web server 100 can recognize whether the screen has been falsified by determining whether the principal information of the screen has been falsified, thus coping with the falsification of the screen.

Furthermore, the client screen falsification prevention apparatus 200 and method are also advantageous in that mutual authentication between each client 300 and the web server 100 is carried out by determining whether principal data transmitted or received therebetween has been changed, so that hacking, caused by the falsification of the screen on the client 300 after authenticating users, can be detected and prevented at the time of conducting important transactions (for example, Internet banking, stock trading, electronic commerce, etc.) over the Internet. That is, in existing security solutions, each user has been authenticated using a password or a One-Time Password (OTP) upon conducting important transactions (for example, Internet backing, stock trading, electronic commerce, etc.) over the Internet. However, in order to solve the problem of the existing security solutions in that it was impossible to determine whether contents displayed on the screen of the client 300 are identical to contents provided by the service provider, the present invention can detect most hacking trials based on the falsification of the screen of the user using a method of checking whether an important transaction such as an electronic transaction recognized by the user is identical to a transaction desired to be performed by the service provider.

Furthermore, the client screen falsification prevention apparatus 200 and method have the advantage of coping with screen falsification attacks such as a web injection attack attributable to unknown malicious code.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for preventing falsification of a client screen comprising at least one or more processors and memory executed on said one or more processors, comprising:
  a random web generation unit loaded on said one or more processors that converts a web page requested by a client into random Uniform Resource Identifiers (URIs) that are randomly generated, and at a request of a plurality of clients, generates different random web sources, and provides the different random web sources to the respective clients, wherein the providing the random web sources comprises:
  at the random web generation unit, if a previously generated random web source corresponding to a web request received from at least one of the plurality of clients is not present, generating a random Uniform Resource Identifier (URI) for a web page corresponding to the web request;
  wherein the random web generation unit comprises: a random URI generation module loaded on said one or more processors that generates the random URIs corresponding to the web page requested by the plurality of clients' and a random web source generation module loaded on said one or more processors that generates the random web sources in connection with the generated random URIs,
  wherein the random web source generation module inserts meaningless web source text into a random location, and randomly changes at least one of a variable name, a tag name, and a function name that are included in a web source; and
  a web falsification determination unit loaded on said one or more processors that compares display web source eigenvalues respectively generated by the clients with respect to any one of the random web sources with a generative web source eigenvalue for the one of the random web sources, thus determines whether screens corresponding to the random web sources displayed on the respective clients have been falsified.

2. The apparatus of claim 1, wherein the random web source generation module generates random variables corresponding to variables that are included in a web source corresponding to the web page corresponding to the generated random URIs, converts the variables of the web source into the generated random variables, and then generates the random web sources.

3. The apparatus of claim 1, wherein the web falsification determination unit comprises:
  a generative web source eigenvalue calculation module loaded on said one or more processors for calculating generative web source eigenvalues of the random web sources; and
  a falsification determination module loaded on said one or more processors for comparing the display web source eigenvalues generated by the respective clients with the calculated, generative web source eigenvalues, thus determining whether screens corresponding to the web sources displayed on the respective clients have been falsified.

4. The apparatus of claim 3, wherein the generative web source eigenvalue calculation module calculates the generative web source eigenvalues using at least one unique key that is shared with the plurality of clients.

5. The apparatus of claim 4, wherein the falsification determination module shares different unique keys with the respective clients.

6. The apparatus of claim 4, wherein the falsification determination module receives a display web source eigenvalue of a random web source calculated using the unique key from at least one of the plurality of clients.

7. The apparatus of claim 1, further comprising a storage unit loaded on said one or more processors for storing the generated random URIs, the random web sources, and the generative web source eigenvalue calculated to determine whether the screens corresponding to the random web sources have been falsified.

8. The apparatus of claim 1, further comprising a display screen verification unit loaded on said one or more processors for requesting entry of input information corresponding to principal information by transmitting the principal information to at least one of the plurality of clients, and for verifying whether a display screen has been falsified by comparing the input information received from the at least one of the clients with the principal information.

9. A method of preventing falsification of a client screen executed on one or more processors, comprising:
   at a random web generation unit loaded on said one or more processors, converting a web page requested by a client into random Uniform Resource Identifiers (URIs) that are randomly generated, at a request of a plurality of clients, generating different random web sources, and providing the different random web sources to the respective clients, wherein the providing the random web sources comprises:
   at the random web generation unit, if a previously generated random web source corresponding to a web request received from at least one of the plurality of clients is not present, generating a random Uniform Resource Identifier (URI) for a web page corresponding to the web request;
   at the random web generation unit, generating a random web source in connection with the generated random URI, wherein the generating the random web source comprises at least one of: at the random web generation unit, randomly inserting meaningless web source text into a random location; and at the random web generation unit, randomly changing at least one of a variable name, a tag name, and a function name that are included in a web source;
   at the random web generation unit, storing the generated random URI and the random web source; and
   at the random web generation unit, transmitting the generated random web source to at least one of the plurality of clients; and
   at a web falsification determination unit loaded on said one or more processors, comparing display web source eigenvalues respectively generated by the clients with respect to any one of the random web sources with a generative web source eigenvalue for the one of the random web sources, thus determining whether screens corresponding to the random web sources displayed on the respective clients have been falsified.

10. The method of claim 9, wherein:
   the providing the random web source further comprises, at the random web generation unit, if the previously generated random web source corresponding to the received web request is present, detecting the random web source, and
   the transmitting is configured such that, at the random web generation unit, the detected random web source is transmitted to the client.

11. The method of claim 9, wherein the generating the random web source comprises:
   at the random web generation unit, generating random variables corresponding to variables that are included in the web page corresponding to the generated random URI; and
   at the random web generation unit, changing the variables included in the web page to the generated random variables, thus generating random web sources.

12. The method of claim 9, wherein the determining whether the screens have been falsified comprises:
   at the web falsification determination unit, receiving a display web source eigenvalue for a random web source calculated from at least one of the plurality of clients using at least one unique key that is shared with the client;
   at the web falsification determination unit, calculating a generative web source eigenvalue for the random web source using the unique key; and
   at the web falsification determination unit, comparing the received display source eigenvalue with the calculated generative web source eigenvalue, thus determining whether a relevant screen has been falsified.

13. The method of claim 12, wherein:
   the determining whether the screens have been falsified further comprises, at the web falsification determination unit, sharing at least one unique key required to calculate web source eigenvalues with the plurality of clients, and
   the sharing the unique key is configured such that, at the web falsification determination unit, different unique keys are shared with respective clients.

14. The method of claim 12, wherein the determining whether the screens have been falsified further comprises, at a storage unit loaded on said one or more processors, storing the calculated generative web source eigenvalue.

15. The method of claim 9, further comprising, at a display screen verification unit loaded on said one or more processors, verifying whether a display screen corresponding to the web source has been falsified, based on input information related to principal information transmitted to at least one of the plurality of clients.

16. The method of claim 15, wherein the verifying whether the display screen has been falsified comprises:
   at the display screen verification unit, transmitting the principal information to at least one of the plurality of clients;
   at the display screen verification unit, displaying the transmitted principal information on the at least one of the plurality of clients and then requesting entry of input information;
   at the display screen verification unit, receiving the input information from the at least one of the plurality of clients; and
   at the display screen verification unit, comparing the transmitted principal information with the received input information, and then verifying whether the display screen has been falsified.

* * * * *